United States Patent [19]
Kampert et al.

[11] 3,789,943
[45] Feb. 5, 1974

[54] VEHICLE DRIVE AND POWER CONTROL MEANS

[75] Inventors: Keith W. Kampert, Libertyville; Kenneth E. Houtz, Streamwood, both of Ill.

[73] Assignee: International Harvester Company, Chicago, Ill.

[22] Filed: Oct. 12, 1971

[21] Appl. No.: 188,062

[52] U.S. Cl. ........... 180/66 R, 192/3.33, 192/103 F
[51] Int. Cl. ........................................... B60k 17/02
[58] Field of Search ........... 180/66 R, 53 R, 53 CD; 192/3.33, 109 F, 103 FA, 4, 103 F

[56] References Cited
UNITED STATES PATENTS

| 3,583,243 | 6/1971 | Wilson | 192/3.33 X |
|---|---|---|---|
| 3,542,175 | 11/1970 | Olson et al. | 192/3.33 |
| 3,352,392 | 11/1967 | Black et al. | 192/109 F X |
| 2,913,061 | 11/1959 | Beyerstedt et al. | 180/66 R |
| 3,202,018 | 8/1965 | Hilpert | 192/3.22 X |

*Primary Examiner*—Kenneth H. Betts
*Assistant Examiner*—David M. Mitchell
*Attorney, Agent, or Firm*—Ronald C. Kamp; Floyd B. Harman

[57] ABSTRACT

An articulated loader having an operator's compartment on the front section and an engine on the rear section connected to drive both a pump means and a modulated clutch, has a valve for varying the pressure in the modulated clutch in order to determine the speed of the vehicle and a foot pedal in the operator's compartment connected to the valve for controlling the position thereof. A stationary housing type torque convertor is driven by the modulated clutch and is connected to drive at least one of the axles of the vehicle.

1 Claim, 1 Drawing Figure

PATENTED FEB 5 1974
3,789,943
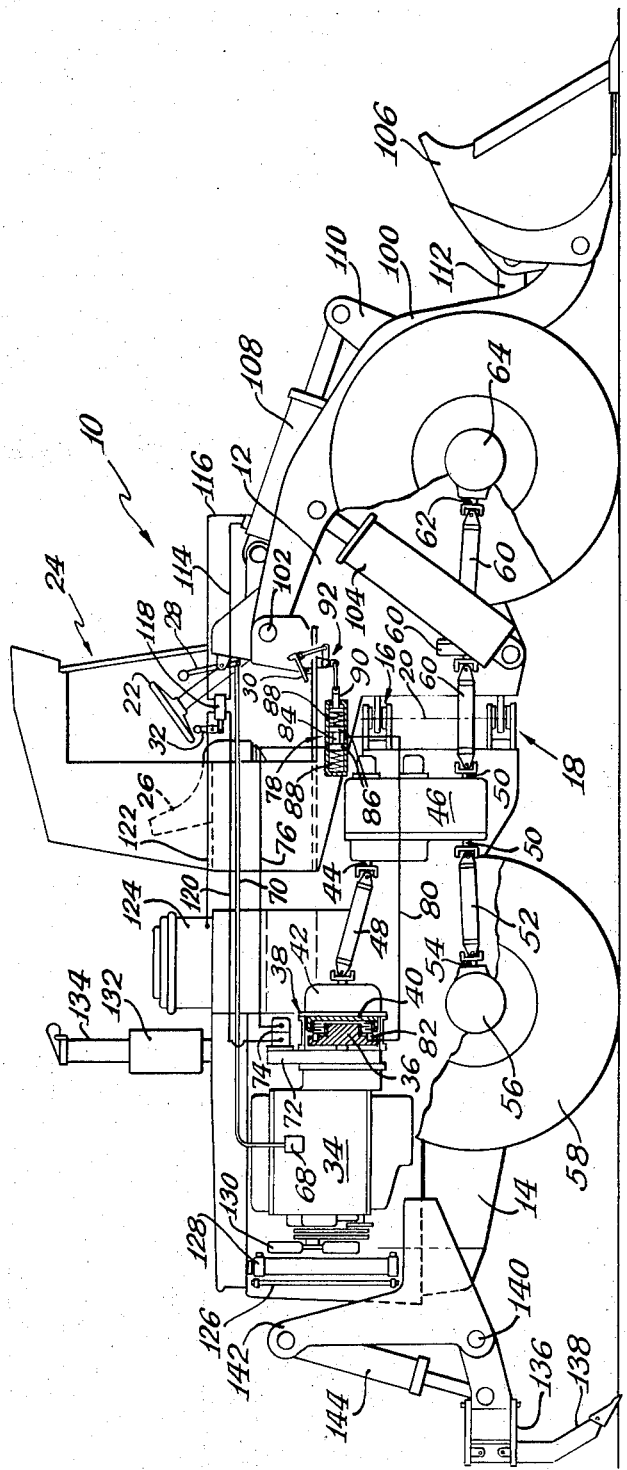
Inventors:
Keith W. Kampert
Kenneth E. Houtz
By
Ronald C. Kamp
Attys.

VEHICLE DRIVE AND POWER CONTROL MEANS

BACKGROUND AND SUMMARY OF THE INVENTION

The engine or power plant provided in construction equipment, for example a wheeled tractor loader, must perform two separate, but related and interdependent tasks. It must provide power for traction in order to propel the vehicle along the ground and it must be capable of driving a hydraulic pump or electric generator in order to provide power for the motor or motors drivingly connected to and operating the implement or tool mounted on or towed by the vehicle. This is commonly referred to as power splitting or deviding, i.e., splitting or dividing the power from the engine between these two tasks. In most instances, the engine provided in the vehicle is sized so that it can provide maximum performance for one task, but something less than maximum performance for the other simultaneously. Under such conditions, a certain amount of skill is required of an operator of such a vehicle to preclude killing the engine and to obtain highly effecient output, in terms of work performed, for the vehicle. This is especially important in cycling type machines where a given maneuver, or series of maneuvers. is required to be repeatedly performed, such as for example, the loading of a truck or other conveyance from a stock pile by a wheeled tractor loader.

It is therefore an object of the present invention to provide a vehicle which will be capable of performing a given maneuver, or series of maneuvers in a minimum amount of time in a most convenient manner for the operator thereof.

It is also an object of this invention to provide a vehicle driveline and control means which does not require any manipulative skill of the operator in order to efficiently split the engine power between tractive effort and auxiliary power requirements.

It is still another object of this invention to provide a vehicle which is efficient from the standpoint of cycle time and which minimizes operator fatigue by lessening the control manipulation and judgement required of an operator and by reducing or narrowing the noise frequencies to which the operator is subjected while working the machine.

These and other objects of the present invention, and the attendant advantages thereof, will become more readily apparent upon a perusal of the following specification and the accompanying drawing, wherein:

The sole FIGURE of the drawing is a side elevational view of a vehicle according to the present invention, with parts broken away and eliminated for clarity, and other portions thereof represented schematically.

DESCRIPTION OF A PREFERRED EMBODIMENT

Referring now to the drawing, there is shown a vehicle, indicated generally at 10, which is of the articulated type having a front section 12 and a rear section 14. The two sections are hinged together by means of an upper hinge 16 and a lower hinge 18 to define the axis of articulation 20. Steering of the vehicle 10 is accomplished by articulating the front and rear sections 12 and 14 about the axis 20 by means of steering cylinders, not shown, connected between these two sections. Control of hydraulic fluid under pressure to these two steering cylinders is by means of a conventional system actuated by means of a steering wheel 22 positioned within an operator's compartment 24 located on the front section 12. Included within the operator's compartment is a seat 26, an engine speed control lever 28, a foot pedal 30 and an implement control lever 32. The function of the levers 28 and 32 and the foot pedal 30 will be explained hereinafter.

An engine 34 is provided on the rear section 14 and is connected to drive the input to a modulated clutch, indicated generally at 38, with the output plate 40 of the clutch 38 being arranged to drive a torque convertor 42. The torque convertor is preferably of the stationary housing type, and may, for example, be similar to that marketed by the Twin Disc Corporation and designated as their Type 4. The input shaft 44 of a forward-reverse and speed change transmission 46 is connected with the output from the torque convertor 42 by means of a driveshaft 48 with universal joints at either end. The output shaft 50 of the transmission 46 is connected through a universal joint with a driveshaft 52, which driveshaft is coupled through a universal joint at its opposite end with the input 54 to the differential of the rear axle 56. The rear axle 56 supports the rear section 14 and is provided at each end with rubber tired wheels 58. The rear axle is connected to the rear frame so that it can oscillate about a horizontal axis oriented longitudinally of the section 14. The other end of the output shaft 50 is connected through a universal joint with a driveshaft 60, which is drivingly connected to the input shaft 62 of the differential for the front axle 64, which axle is rigidly affixed to the front section 12. The driveshaft 60 may be of one piece, or as illustrated, may be provided in two sections with a brake means 66 interposed therebetween.

The engine 34 is provided with a speed control means 68 which, depending upon whether the engine is of the diesel or spark ignited type, will be either a fuel injection means or a carburetor means. The speed control means 68 is connected with the lever 28 in the operator's compartment 24 by any convenient means, such as, for example, a bodin wire 70. The lever 28 is arranged so that it is capable of being positioned to cause the control means 68 to run the engine at idle speed or at or near the rated engine speed for the engine 34. The lever 28 would then be positioned for idle setting whenever the vehicle is being serviced, during warm-up of the engine, or when waiting for hauling vehicles to maneuver into loading position. When the lever 28 is positioned for full speed of the engine 34, the control means 68 would be oriented to operate the engine at maximum power.

A pump drive means 72 is also connected to be driven by the engine 34 and, in turn, drives the pump means 74. A conduit 76 extends between the pump means 74 and the inlet to a drive valve 78. The outlet from the drive valve 78 is connected by conduit 80 to the ring piston 82 in the modulated clutch 38. The amount of hydraulic pressure directed to the backside of the piston 82 will determine the amount of slippage within the clutch 38 and, hence, the speed of the output plate 40, which is connected with and will determine the input speed to the torque convertor 42. The speed at which the torque convertor 42 is driven will, in turn, determine the ground speed of the vehicle, depending upon the range selected in the transmission 46. The valve 78 is provided with a spool 84 having a land 86 at each end, which spool is centered by means of springs 88 so that the land 86 locks the flow of hydraulic fluid through conduit 76. A piston 90 is reciprocal within one end of the valve 78 and is connected through a linkage 92 to the pedal 30, which is pivotally mounted within the operator's compartment 24. As the pedal 30 is depressed, from the position illustrated in the drawing, the linkage 92 shifts the piston 90 toward the left, causing the land 86 to uncover the conduit 76. Hydraulic pressure is then directed through conduit 76 and 80 to the backside of the piston 82. The pressure to the piston 82 is then controlled by the amount of displacement of the spool 84 and, hence, the amount the inlet port is uncovered. The land 86 and the inlet port then comprise a variable orifice with the pressure drop thereacross being established by flow therethrough, which flow is possible due to leakage of hydraulic fluid around the piston, which leakage serves the additional function of cooling the clutch plates. It will be apparent therefore that the foot pedal 30 will control the speed of the vehicle 10 from zero to maximum velocity, provided the speed control lever 28 has been positioned for full speed of the engine 34.

A pair of boom arms 100 are pivotally connected to the front frame section 12 by means of pivot pins 102 and are pivoted thereabout by means of a hydraulic ram 104, connected between the front section 12 and the boom arms, to effect raising and lowering of the bucket 106 pivotally mounted at the other end of the boom arms. A bucket ram 108 is connected between the front frame section 12 and one leg of a bellcrank 110 which is rotatably mounted between the boom arms 100. A link 112 is pivotally connected between the other arm of the bellcrank 110 and the bucket 106. Coordinated extension and retraction of the boom ram 104 and bucket ram 108 is required during operation of the vehicle 10, the boom ram 104 controlling the height of the bucket 106 and the bucket ram 108 controlling the dumping and rollback of the bucket 106. Flow of hydraulic fluid to either end of each of these rams is required in order to effect extension and retraction thereof. However, for simplicity of illustration and clarity, only the hydraulic circuit for the bucket ram 108 will be described, circuitry for other hydraulic rams, such as boom ram 104, being similar. A pair of conduits 114 and 116, one of which is connected with the head end of ram 108 and the other of which is connected to the rod end of ram 108, communicate with a valve 118. Hydraulic fluid under pressure is supplied through conduit 120 to the valve 118 from the pump means 74. A return line 122 extends between the valve 118 and the hydraulic reservoir 124. Manipulation of the control lever 32 in either direction, selectively connects the pressure line or conduit 120 with one of the conduits 114 and 116 while simultaneously connecting the other of these conduits with the return conduit 122. Hence, the control lever 32 permits the operator to selectively extend or retract the bucket cylinder 108 to either roll the bucket back or dump it forward.

The pressure and volume required for operation of the circuit for the bucket ram 108, and correspondingly for other working hydraulic implements on the vehicle, is much higher than the volumes and pressures required for actuation of the modulated clutch 38. It is desireable, therefore, to provide two separate and independent pumps for the pump means 74. That is, the pump means 74 would be provided with a separate pump to supply relatively low volume of oil at a maximum of 250 psi, for example, while the other pump for the pump means 74 would supply a much higher volume at 2,500 psi, for example, in order to supply hydraulic fluid for the working cylinders. Separate pumps and circuits are also necessitated due to the use of different types of oils.

Cyclical vehicles, such as loaders, must have adequate travel speed in order to minimize the cycle time and preferably should have such adequate speed for the working cycle within one speed range of the transmission. Such an arrangement would then make it unnecessary for the operator to make speed range changes during the working cycle. The operator would have to concern himself with direction changes and the manipulation of the bucket and boom without being concerned with the need for effecting speed range changes in the transmission during the work cycle. Operator fatique is thereby minimized and loader efficiency maximized.

In addition, the speed of the vehicle should be related to the position of the pedal 30 so that the use of brakes is minimized. Not only does this minimize wear on the brakes, but it also contributes to minimizing operator fatigue. A stationary housing torque having a high stall torque ratio, i.e., the ratio of output torque to input torque, will, in effect, assure that the modulated clutch 38 will slip to the degree determined by the pedal 30. That is, if the operator has the pedal 30 fully depressed, for example, causing lock-up in the clutch 38 then positions the pedal 30 differently, the high relatively constant converter input torque will cause the driven plates of the clutch to slip to the degree determined by the new position of the pedal, overcoming any friction and centrifugal pressure occurring within the clutch which would otherwise cause the clutch to maintain its prior slip condition. Hence, as the operator lets up on the pedal 30, the vehicle will slow down without the need of utilizing the vehicle brakes.

Economics is involved not only in consideration of cycle time for the loader, but also in the size of the engine 34. The larter the engine, in terms of power output at a given speed, the more expensive it is. It is apparent that an engine could be provided which is much larger than that required to simultaneously supply power for maximum tractive effort and maximum power for the auxiliary equipment, such as the hydraulic pump means 74, but which would be completely unacceptable because of its cost. It has been determined that optimum loader characteristics can be provided when the engine is sized so that when subjected to maximum tractive effort and maximum auxiliary power load, the engine will lug back 15 percent of its rated speed. However, acceptable operation can be achieved even when the engine speed is reduced, under such conditions up to 25 percent below its rated speed.

Since the torque convertor 32 and the modulated clutch 38 will be generating considerable heat during at least a portion of the normal working cycle for the vehicle 10, some means must be provided for removing the heat from these components. Oil is therefore provided in relatively large quantities to absorb the heat in the components and is then directed to a radiator means 126 to transfer the heat from the oil to the atmosphere. The radiator 126 is in addition to the normal radiator 128 provided to transfer the heat from the cooling water for the engine to the atmosphere. A fan 130 driven by the engine 34 insures positive circulation of the air through the radiators 126 and 128.

A muffler 132 is provided in the exhaust system 134 for the engine 34. During normal working operations of the vehicle 10, the lever 28 is positioned so that the control means 68 conditions the engine 34 for operation at rated speed. This means that the engine will be operating at substantially the same speed during the operations of the vehicle, as opposed to accelerating from idle up to rated speed and back down to idle speed again as the vehicle 10 cycles. Acceleration of the vehicle under load particularly creates noise which is of variable frequency. That is, as the speed of the engine 34 varies, the frequency of the noise generated thereby varies over a wide range. By operating the vehicle engine 34 at a relatively constant speed, the frequency of noise generated remains in a relatively narrow band. Muffling of a constant or relatively constant frequency is much easier than muffling for a wide range of frequencies, and hence, the muffler 134 can be designed for the relatively narrow frequency of noises generated during operation of the engine 34 at a substantially constant speed.

In addition to the bucket 106 provided on the front of the tractor 10, additional implements may also be mounted thereon. For example, a ripper 136 having a single or multiplicity of toothed shanks 138 is pivotally mounted at 140 on a frame member 142 secured to the rear section 14 of the tractor 10. A hydraulic ram 144 is connected between the frame 142 and the ripper frame 136. A hydraulic circuit for operation of the hydraulic ram 144 would be similar to that provided for the bucket ram 108.

While one embodiment of the present invention has been disclosed, it is to be understood that various changes and modifications may be made therein without departing from the spirit of the invention as defined by the scope of the appended claims.

What is claimed is:

1. In a tractor with wheeled axles and having a weight capable of providing a given maximum tractive effort and a hydraulic system including pump means capable of supplying hydraulic fluid at a given maximum pressure; the improvement comprising:

an engine mounted on the tractor and drivingly connected to the pump means;

engine control means having at least two positions, an idle position for causing the engine to run at idle speed and a full position for setting the engine to run at its rated horsepower speed;

a modulated clutch driven by the engine and including hydraulic piston means for varying the amount of slip in the clutch from complete disengagement to lock-up;

a valve for varying the pressure in the hydraulic piston means from substantially zero pressure at complete disengagement to full pressure at lock-up;

a foot pedal connected to said valve and operable between an outward position in which the valve transmits said zero pressure and a fully depressed position in which the valve transmits full pressure;

bias means for urging said pedal to its outward position and said valve to said zero pressure setting;

a torque convertor of the stationary housing type driven by the modulated clutch;

a transmission driven by the torque convertor;

drive means connecting said transmission to at least one of the axles;

and the engine being capable of driving the tractor with the modulated clutch at lock-up at said maximum tractive effort while simultaneously driving the pump means at said maximum pressure.

* * * * *